United States Patent [19]
Kelley

[11] Patent Number: 6,053,515
[45] Date of Patent: Apr. 25, 2000

[54] HANDY CARRIER

[76] Inventor: Earnest Kelley, 9518 Sterling Dr., Miami, Fla. 33157

[21] Appl. No.: 09/224,506

[22] Filed: Dec. 31, 1998

[51] Int. Cl.$^7$ ....................................................... B62B 3/02
[52] U.S. Cl. ..................... 280/47.18; 280/653; 280/655; 280/47.26; 280/47.34
[58] Field of Search ........................ 280/30, 656, 47.26, 280/47.27, 47.29, 47.18, 47.24, 5.24, 47.34, 47.36, 653, 655, 47.31

[56] References Cited

U.S. PATENT DOCUMENTS

| | | | |
|---|---|---|---|
| 944,291 | 12/1909 | Spangler | 280/47.26 X |
| 990,416 | 4/1911 | Ballinger | 280/47.27 X |
| 1,024,469 | 4/1912 | Ballinger | 280/47.27 X |
| 1,631,333 | 6/1927 | Privat . | |
| 2,263,879 | 11/1941 | Jorgensen | 280/5.24 |
| 2,472,989 | 6/1949 | Skipper et al. . | |
| 2,767,996 | 10/1956 | Seyforth | 280/47.26 |
| 2,768,022 | 10/1956 | Pope | 280/47.26 X |
| 3,166,339 | 1/1965 | Earley | 280/47.26 |
| 3,194,576 | 7/1965 | Kunkle | 280/47.26 |
| 3,785,669 | 1/1974 | Doheny . | |
| 4,136,889 | 1/1979 | Middleton . | |
| 4,227,709 | 10/1980 | Gradwohl et al. . | |
| 4,588,197 | 5/1986 | Benedetto, Jr. . | |
| 4,802,681 | 2/1989 | Hung | 280/47.29 X |
| 4,958,846 | 9/1990 | Greenberg | 280/47.26 X |
| 5,118,130 | 6/1992 | Kaltz | 280/47.29 X |
| 5,257,892 | 11/1993 | Branch . | |
| 5,465,987 | 11/1995 | DellaVecchia | 280/47.26 X |

*Primary Examiner*—Michael Mar

[57] ABSTRACT

A carrier comprising a carrier box formed with a rectangular base plate with side edges and remote and near edges and with a plurality of plates including a remote end plate extending upwardly from the remote edge of the base plate at a right angle with respect thereto and having a generally rectangular configuration and with a near end plate and a hinge coupling the lower end of the near end plate to the near edge of the base plate and with a pair of side plates with a linear lower edge positioned adjacent the side edges of the base plate with parallel hinges coupled with respect thereto. A tubular frame assembly includes parallel sides having upper extents coupled by rivets to the lower surface of the base plate adjacent to the side edges and extending nearwardly thereof with a generally u-shaped extension extending nearwardly of the parallel sides. A pair of wheels are mounted for rotational movement about a common axis of rotation beneath the base plate adjacent to the remote end. A pair of casters with rotatable wheels are provided for rotation beneath the side rails with each of the wheels mounted for swivel movement about a vertical axis.

1 Claim, 2 Drawing Sheets

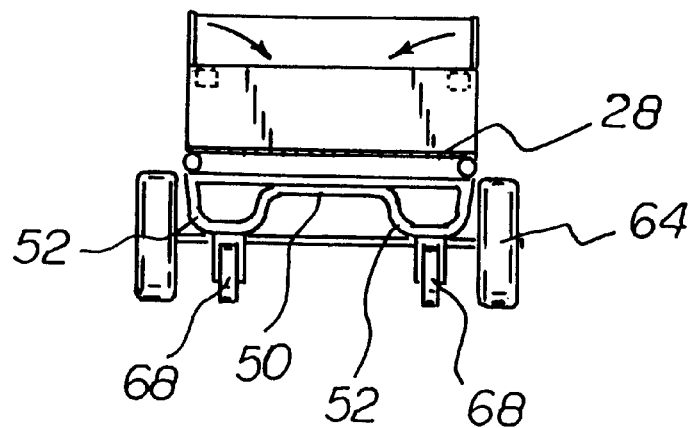
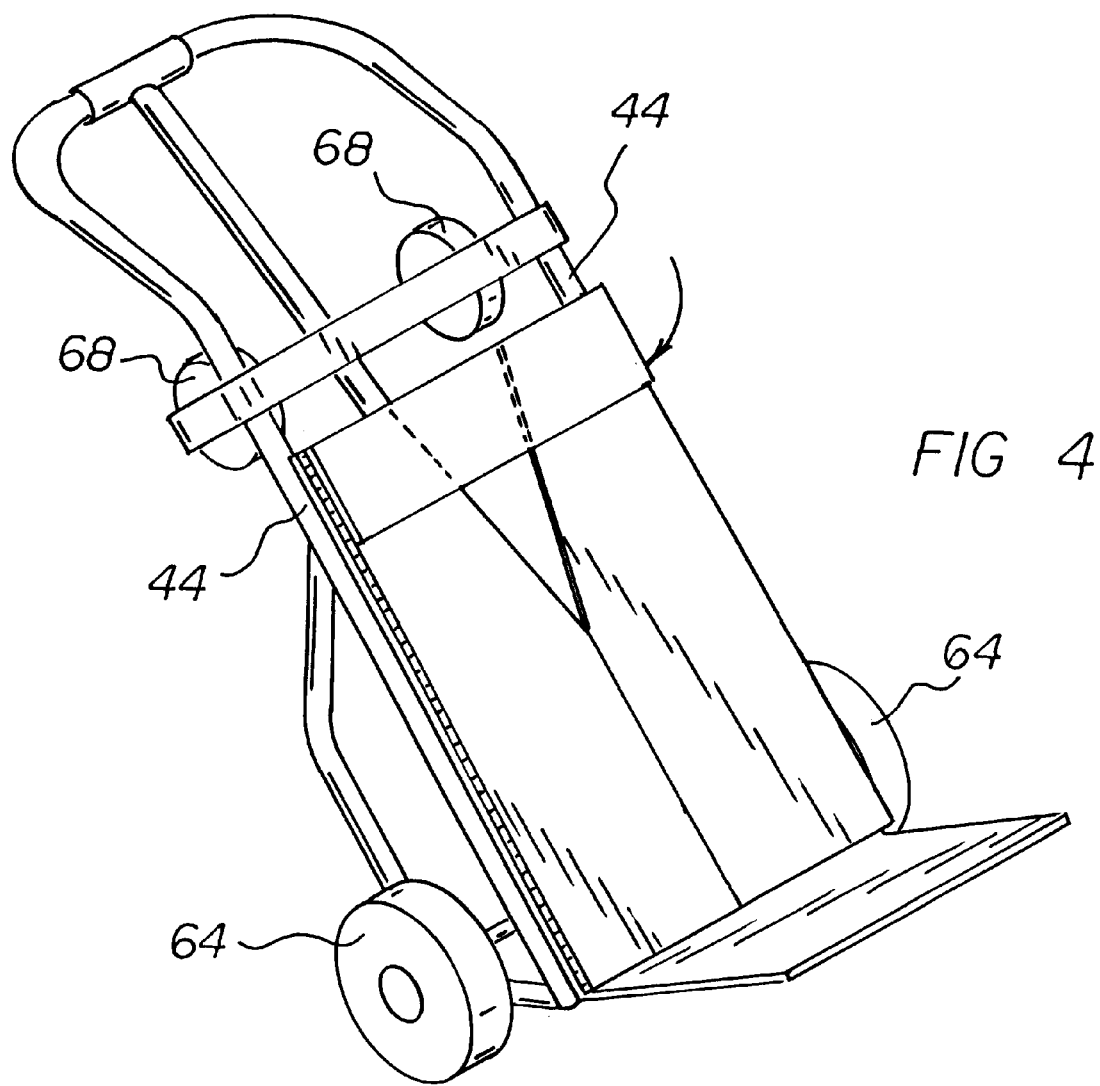

HANDY CARRIER

BACKGROUND OF THE INVENTION

1. Field of the Invention

The present invention relates to a handy carrier adapted for multiple uses and more particularly pertains to reconfiguring a carrier for use as a dolly, wheel barrow, wagon and push cart as a function of the configuration of its component elements.

2. Description of the Prior Art

The use of carriers of known designs and configurations is known in the prior art. More specifically, carriers of known designs and configurations heretofore devised and utilized for the purpose of reconfiguring carriers through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 1,631,333 to B. Privat discloses a garden wheelbarrow. U.S. Pat. No. 4,588,197 to Benedetto, Jr. discloses a modular hand cart. U.S. Pat. No. 5,257,892 to Branch discloses a multiple purpose transporting device. U.S. Pat. No. 3,785,669 to Doheny discloses a convertible bulk hand truck. U.S. Pat. No. 4,136,889 to Middleton discloses a collapsible trolley. U.S. Pat. No. 4,227,709 to Gradwohl, et al discloses a convertible hand truck-wagon. Lastly, U.S. Pat. No. 2,472,989 to J. Skipper, et al discloses a portable truck.

While these devices fulfill their respective, particular objectives and requirements, the aforementioned patents do not describe a handy carrier adapted for multiple uses that allows reconfiguring a carrier for use as a dolly, wheel barrow, wagon and push cart as a function of the configuration of its component elements.

In this respect, the handy carrier adapted for multiple uses according to the present invention substantially departs from the conventional concepts and designs of the prior art, and in doing so provides an apparatus primarily developed for the purpose of reconfiguring a carrier for use as a dolly, wheel barrow, wagon and push cart as a function of the configuration of its component elements.

Therefore, it can be appreciated that there exists a continuing need for a new and improved handy carrier adapted for multiple uses which can be used for reconfiguring a carrier for use as a dolly, wheel barrow, wagon and push cart as a function of the configuration of its component elements. In this regard, the present invention substantially fulfills this need.

SUMMARY OF THE INVENTION

In view of the foregoing disadvantages inherent in the known types of Carriers of known designs and configurations now present in the prior art, the present invention provides an improved handy carrier adapted for multiple uses. As such, the general purpose of the present invention, which will be described subsequently in greater detail, is to provide a new and improved handy carrier adapted for multiple uses and method which has all the advantages of the prior art and none of the disadvantages.

To attain this, the present invention essentially comprises a carrier box. The carrier box is formed with a rectangular base plate with long side edges and short remote and near edges. The carrier box also has a plurality of plates. A remote end plate fixedly extends upwardly from the remote edge of the base plate at a right angle with respect thereto and has a generally rectangular configuration. A near end plate has a height less than the height of the remote end plate. A hinge couples the lower end of the near end plate to the near edge of the base plate. In this manner movement of the rear end plate between a raised operative position at a right angle with respect to the base plate and a lowered stowed orientation essentially parallel with the base plate in close proximity thereto is effected. Next provided are a pair of side plates having a generally rectangular configuration. The side plates have a linear lower edge positioned adjacent the side edges of the base plate. Parallel hinges are coupled with respect thereto for movement of the side plates between a raised operative position at right angles to the base plate when in a raised operative and a lowered stowed orientation parallel with and in close proximity to the base plate. The height of the base plate is essentially half of the width of the base plate. The upper edge of the side plates includes a tapered near region. Next provided are a plurality of small rectangular magnets secured to the upper corners of the remote plate, near plate, and side plates. The magnets function to hold the plates in the operative orientation at right angles with respect to the base plate when the carrier box is in the deployed orientation. Next provided is a tubular frame assembly. The frame assembly includes parallel sides having upper extents coupled by rivets to the lower surface of the base plate adjacent to the side edges and extending nearwardly thereof. A generally u-shaped extension extends rearwardly of the parallel sides and is angled downwardly at an intermediate point thereof. Supplemental loop-shaped tubes extend between an intermediate portion of the side edges to the remote edge of the base plate. An intermediate rearward tube with u-shaped regions extends downwardly from an area adjacent to the remote edge of the base plate. Next provided is a supplemental handle. The handle has a near gripping end. The handle also has a remote cylindrical end pivotably coupled to a central extent of the u-shaped support extension. Next provided are a pair of large wheels. The wheels are mounted for rotational movement about a common axis of rotation beneath the base plate coupled to the u-shaped regions adjacent to the remote end. Lastly, a pair of casters are provided. The casters have rotatable small wheels mounted to the parallel sides for rotation beneath the side rails nearwardly of the base plate. Each of the wheels is mounted for swivel movement about a vertical axis.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved handy carrier adapted for multiple uses which has all of the advantages of the prior art carriers of known designs and configurations and none of the disadvantages.

It is another object of the present invention to provide a new and improved handy carrier adapted for multiple uses which may be easily and efficiently manufactured and marketed.

It is further object of the present invention to provide a new and improved handy carrier adapted for multiple uses which is of durable and reliable constructions.

An even further object of the present invention is to provide a new and improved handy carrier adapted for multiple uses which is susceptible of a low cost of manufacture with regard to both materials and labor, and which accordingly is then susceptible of low prices of sale to the consuming public, thereby making such handy carrier adapted for multiple uses economically available to the buying public.

Even still another object of the present invention is to provide a handy carrier adapted for multiple uses for reconfiguring a carrier for use as a dolly, wheel barrow, wagon and push cart as a function of the configuration of its component elements.

Lastly, it is an object of the present invention to provide a new and improved carrier comprising a carrier box formed with a rectangular base plate with side edges and remote and near edges and with a plurality of plates including a remote end plate extending upwardly from the remote edge of the base plate at a right angle with respect thereto and having a generally rectangular configuration and with a near end plate and a hinge coupling the lower end of the near end plate to the near edge of the base plate and with a pair of side plates with a linear lower edge positioned adjacent the side edges of the base plate with parallel hinges coupled with respect thereto, a tubular frame assembly including parallel sides having upper extents coupled by rivets to the lower surface of the base plate adjacent to the side edges and extending nearwardly thereof with a generally u-shaped extension extending nearwardly of the parallel sides, a pair of wheels mounted for rotational movement about a common axis of rotation beneath the base plate adjacent to the remote end, a pair of casters with rotatable wheels for rotation beneath the side rails with each of the wheels mounted for swivel movement about a vertical axis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevational view of the device shown in FIGS. 1 and 2.

FIG. 4 is a perspective illustration of the device shown in the prior figures, but configured for use as a dolly with three of its side walls collapsed but capable of use as a wheel barrow with the three side plates raised.

The same reference numerals refer to the same parts through the various Figures.

DESCRIPTION OF THE PREFERRED EMBODIMENT

Figure 1:
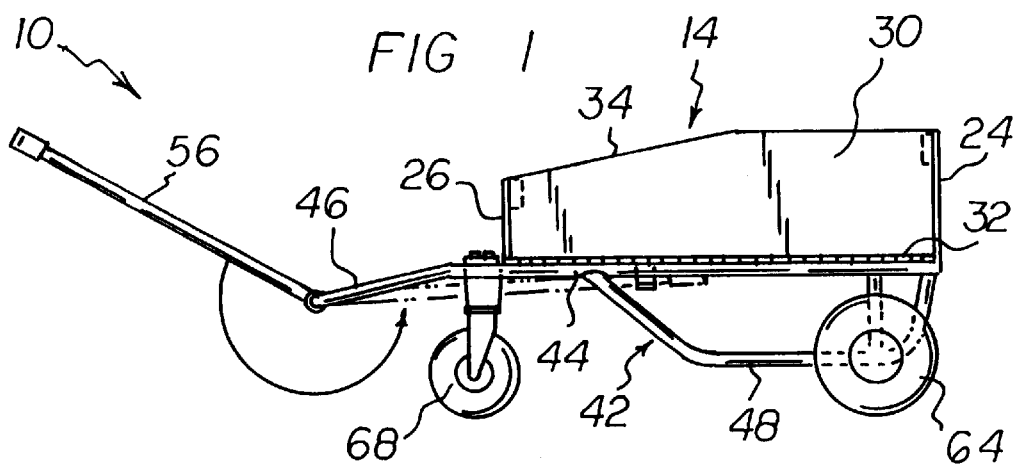
FIG. 1 is a side elevational view of the new and improved constructed in accordance with the principles of the present invention, this illustration showing the device for use as a wagon with the pivotal handle forwardly and for use as a push cart with the pivotal handle moved rearwardly.
Figure 2:
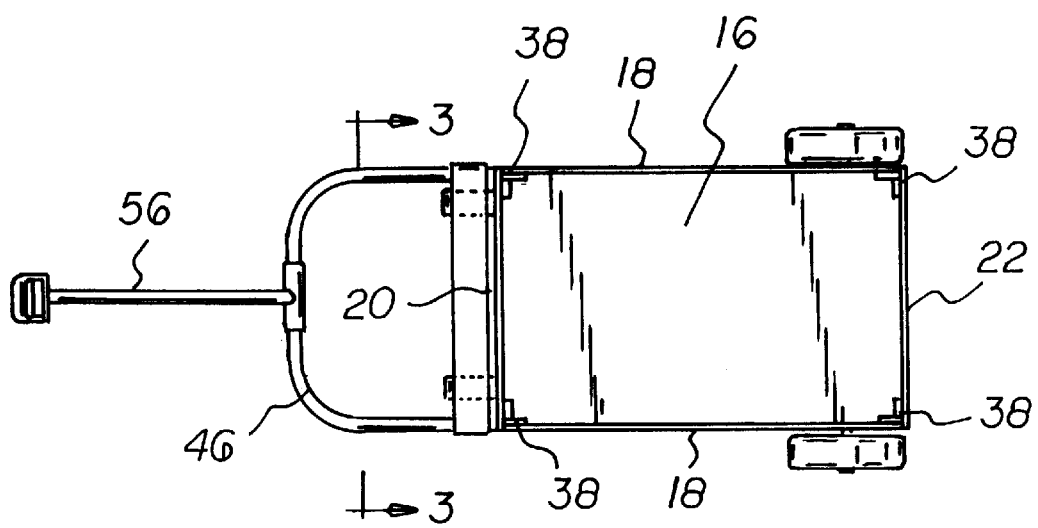
FIG. 2 is a top elevational view of the device shown in FIG. 1.

With reference now to the drawings, and in particular to FIG. 1 thereof, the preferred embodiment of the new and improved handy carrier adapted for multiple uses embodying the principles and concepts of the present invention and generally designated by the reference numeral 10 will be described.

The present invention, the handy carrier adapted for multiple uses 10 is comprised of a plurality of components. Such components in their broadest context include a carrier box, a plurality of small rectangular magnets, a tubular frame assembly, a supplemental handle, a pair of large wheels, and a par of casters. Such components are individually configured and correlated with respect to each other so as to attain the desired objective.

The carrier box 14 is formed with a rectangular base plate 16 with long side edges 18 and short remote and near edges 20, 22. The carrier box also has a plurality of plates. A remote end plate 24 fixedly extends upwardly from the remote edge of the base plate at a right angle with respect thereto and has a generally rectangular configuration. A near end plate 26 has a height less than the height of the remote end plate. A hinge 28 couples the lower end of the near end plate to the near edge of the base plate. In this manner movement of the near end plate between a raised operative position at a right angle with respect to the base plate and a lowered stowed orientation essentially parallel with the base plate in close proximity thereto is effected. Next provided are a pair of side plates 30 each having a generally rectangular configuration. The side plates have a linear lower edge positioned adjacent the side edges of the base plate. Parallel hinges 32 are coupled with respect thereto for movement of the side plates between a raised operative position at right angles to the base plate when in a raised operative and a lowered stowed orientation parallel with and in close proximity to the base plate. The height of the base plate is essentially half of the width of the base plate. The upper edge of the side plates includes a tapered near region 34.

Next provided are a plurality of small rectangular magnets 38 secured to the upper corners of the remote plate, near plate, and side plates. The magnets function to hold the plates in the operative orientation at right angles with respect to the base plate when the carrier box is in the deployed orientation.

Next provided is a tubular frame assembly 42. The frame assembly includes parallel sides 44 having upper extents coupled by rivets to the lower surface of the base plate adjacent to the side edges and extending nearwardly thereof.

A generally u-shaped extension 46 extends rearwardly of the parallel sides and is angled downwardly at an intermediate point thereof. Supplemental loop-shaped tubes 48 extend between an intermediate portion of the side edges to the remote edge of the base plate. An intermediate rearward tube 50 with u-shaped regions 52 extends downwardly from an area adjacent to the near edge of the base plate as shown in FIGS. 3 and 4.

Next provided is a supplemental handle 56. The handle has a near gripping end. The handle also has a remote cylindrical end pivotably coupled to a central extent of the u-shaped support extension.

Next provided are a pair of large wheels 64. The wheels are mounted for rotational movement about a common axis of rotation beneath the base plate coupled to the u-shaped regions 52 adjacent to the remote end.

Lastly, a pair of casters 68 are provided. The casters have rotatable small wheels mounted to the parallel sides for rotation beneath the side rails rearwardly of the base plate. Each of the wheels is mounted for swivel movement about a vertical axis.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A carrier which is convertible for use between a dolly, a wagon, and a wheelbarrow comprising, in combination:

a carrier box formed with a rectangular base plate having a pair of opposed side edges and opposed remote and near edges, the side edges being longer than the remote and near edges, and a plurality of plates including a remote end plate having a substantially rectangular configuration, the remote end plate having a lower edge fixedly attached to the remote edge of the base plate and extending upwardly at a right angle therefrom, a near end plate having a substantially rectangular configuration with a height less than a height of the remote end plate, the near end plate having a lower edge coupled to the near edge of the base plate for pivotal movement of the near end plate between a raised operative position extending at a right angle with respect to the base plate and a lowered stowed position essentially parallel with the base plate in close proximity thereto, and a pair of side plates with linear lower edges coupled to respective side edges of the base plate for pivotal movement of the side plates between a raised operative position extending at right angles to the base plate and a lowered stowed position parallel with and in close proximity to the base plate, each of the side plates having a remote region and a near region, the remote region having an upper edge substantially parallel with the lower edge of the side plate and the near region having an upper edge which tapers with respect to the lower edge of the side plate;

a plurality of rectangular magnets secured to upper corners of the remote plate, the near plate, and the side plates for holding the near plate and the side plates in the raised operative position at right angles with respect to the base plate when the carrier is used as a wagon or a wheelbarrow;

a tubular frame assembly including parallel side frame members with upper extents coupled by rivets to a lower surface of the base plate adjacent to the side edges, a U-shaped extension joined to the side frame members adjacent the near edge of the base plate, the U-shaped extension having a central portion extending transversely between a pair of leg portions, the central portion functioning as a handle when the carrier is used as a dolly or a wheelbarrow, a lower frame member mounted below each side frame member, each lower frame member having a lower portion extending substantially parallel to the side frame member and end portions extending upwardly to the side frame member, and an intermediate frame member extending laterally between the side frame members adjacent the near edge of the base plate, the intermediate frame member including a pair of laterally spaced, depending U-shaped portions;

a supplemental handle having a first end with a gripping portion and a second end with a cylindrical sleeve portion for receiving therethrough the central portion of the U-shaped extension, the supplemental handle being pivotable between an extended position when the carrier is used as a wagon and a stowed position extending below the base plate when the carrier is used as a dolly or a wheelbarrow;

a pair of wheels rotatably supported by an axle coupled to the lower frame members adjacent the remote edge of the base plate; and a pair of caster wheels mounted to lowermost surfaces of the pair of U-shaped portions of the intermediate frame member for supporting the carrier when used as a wagon.

* * * * *